United States Patent [19]
Riddle

[11] Patent Number: 5,577,311
[45] Date of Patent: Nov. 26, 1996

[54] REAR DRIVE M113 CONVERSION METHOD

[75] Inventor: Matthew G. Riddle, San Jose, Calif.

[73] Assignee: FMC Corp., Chicago, Ill.

[21] Appl. No.: 349,338

[22] Filed: Dec. 5, 1994

[51] Int. Cl.⁶ .................................................. B21K 21/16
[52] U.S. Cl. ............................. 29/401.1; 29/426.2
[58] Field of Search ........................... 29/401.1, 402.01, 29/402.04, 426.1, 426.2; 296/188

[56] References Cited

U.S. PATENT DOCUMENTS

| | | | |
|---|---|---|---|
| 4,342,146 | 8/1982 | Hanson | 29/401.1 |
| 4,599,780 | 7/1986 | Rohrbacher | 29/401.1 |
| 4,654,946 | 4/1987 | Phillips | 29/401.1 |
| 4,766,660 | 8/1988 | La Rose | 29/401.1 |

*Primary Examiner*—David P. Bryant

[57] ABSTRACT

This invention pertains to a method of rear drive conversion of the M113 family of vehicles to provide a light, mobile and tactical hybrid vehicle. The method includes stripping an M113 to a base aluminum hull and providing modified or newly fabricated parts to enable the conversion. Using the rear drive conversion process disclosed herein, critical operations parameters such as volume under armor, mobility, air transportability and vehicle performance efficiency per unit weight are significantly increased.

7 Claims, 2 Drawing Sheets

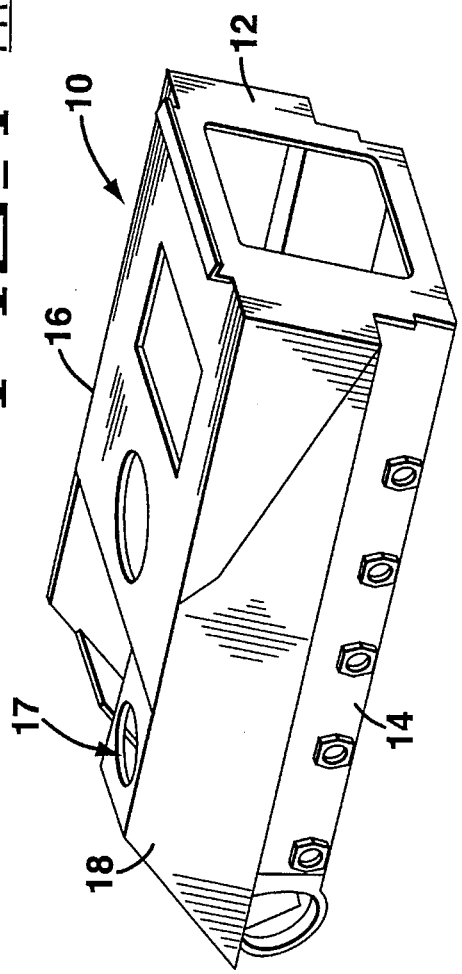
FIG_1 PRIOR ART
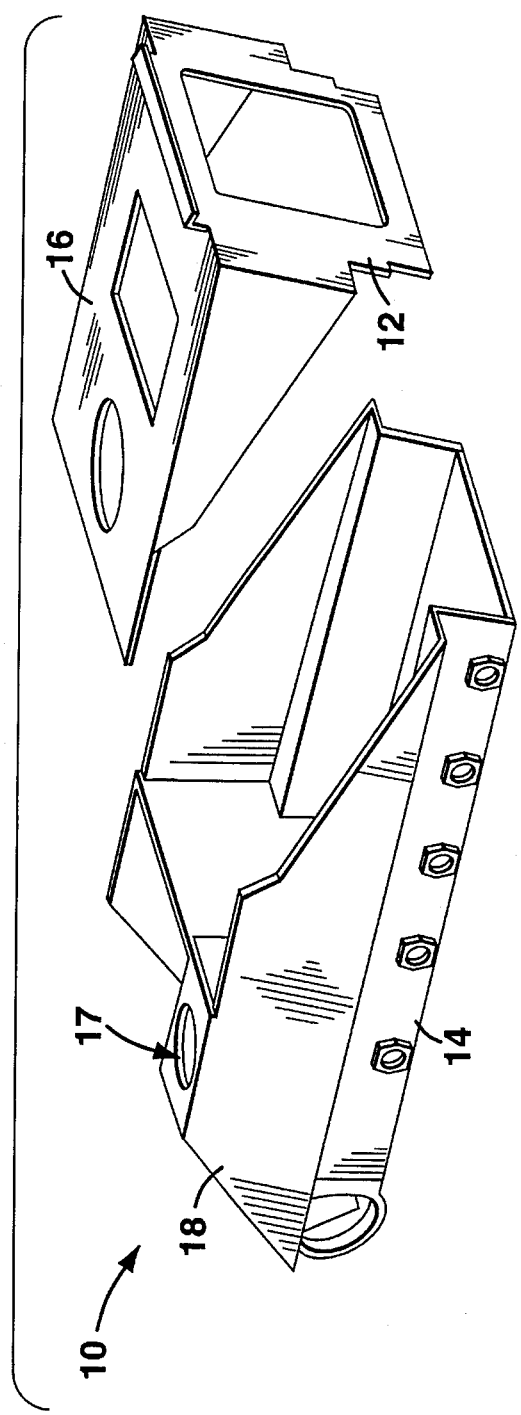
FIG_2A PRIOR ART

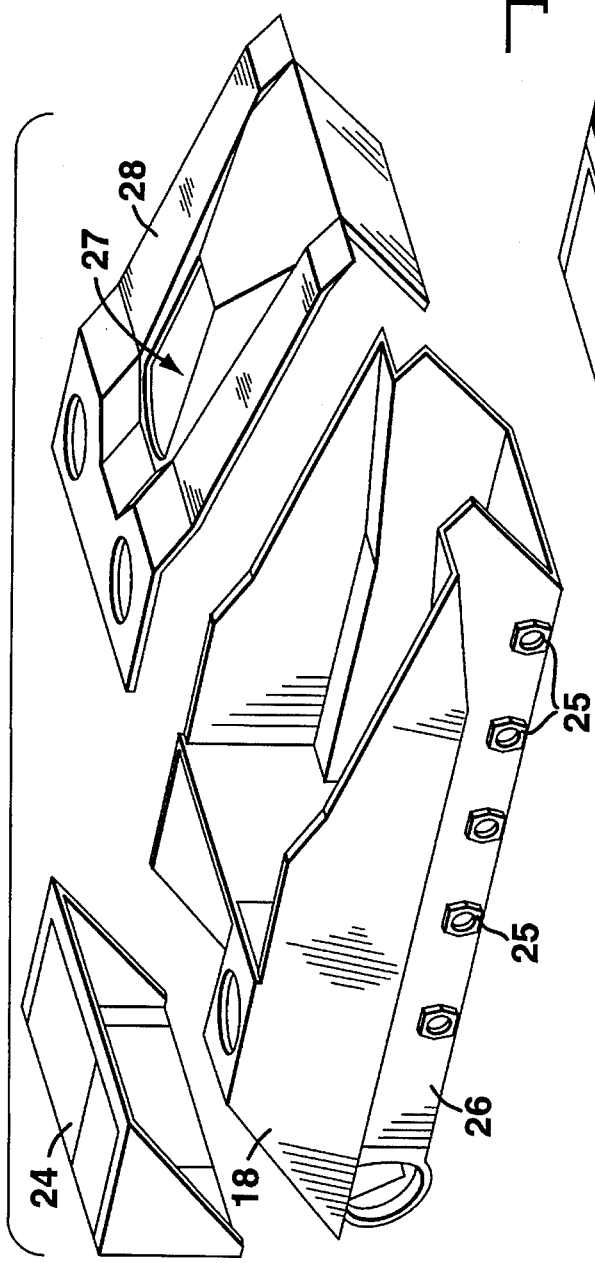
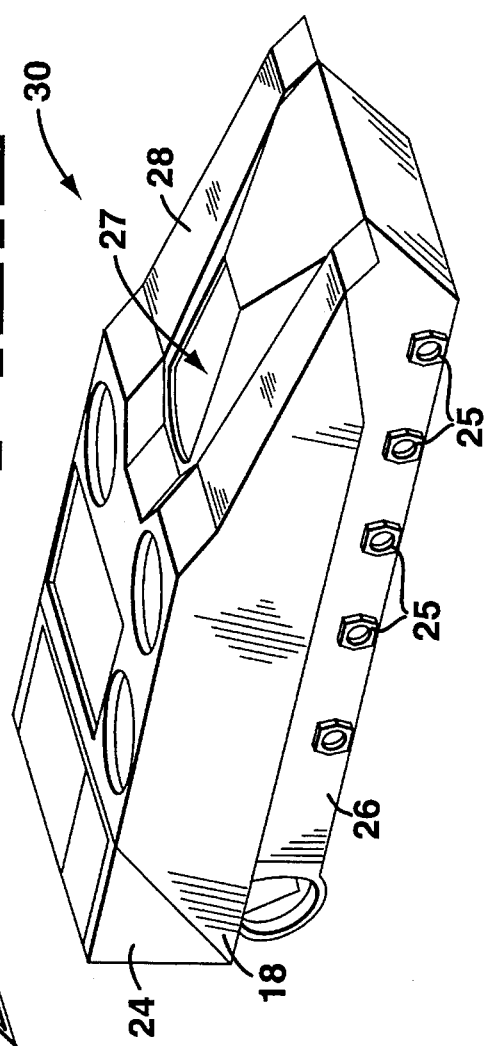

REAR DRIVE M113 CONVERSION METHOD

FIELD OF THE INVENTION

The present invention provides a method for converting a family of the M113 vehicles to develop a low cost and light vehicle for use in scouting and other tactical missions.

SUMMARY OF THE INVENTION

The present invention is primarily concerned with the modernization of M113 family of vehicles to provide a cost effective, light and tactical vehicle. This family of vehicles has undergone various changes over the years. The present invention is distinguished in that minimal changes are made to significantly improve the operational and functional features of the M113 vehicles.

BRIEF DESCRIPTION OF THE DRAWINGS

FIG. 1 is a perspective drawing of an M113 structure with the driver's station shown in its original position.

FIG. 2A is an explosion view of an M113 structure with the rear portion removed and the rear sponson area indicated.

FIG. 2B is an explosion view of an M113 structure with a new rear stowage area and a new front plate the major parts indicated.

FIG. 3 is a perspective view of a modified M113 structure.

DESCRIPTION OF THE PREFERRED EMBODIMENT

The present invention provides a method of modifying and converting an M113 vehicle to develop a low cost and light tactical vehicle for use in scouting, reconnaissance and other missions.

FIG. 1 shows a perspective drawing of an M113 structure 10 with the driver's station shown in its original position. FIG. 2A is an exploded view of structure 10. Rear plate 12 is disposed between lower hull 14 and top plate 16. Further, upper hull 18 is attached to lower hull 14.

FIG. 2A shows an exploded view of an M113 structure. Rear plate 12 and top plate 16 are disengaged from upper hull 18 and lower hull 14.

FIG. 2B is an explosion view of a modified M113 vehicle. New stowage area 24 and modified lower hull 26 are matched to next front plate 28. FIG. 3 shows an assembly 30 of a modified rear drive M113 vehicle.

The discussion hereinabove relates to the most significant structural and component organizations of the rear drive M113 conversion. The method of conversion, disclosed in the present invention, under a best mode scenario is discussed hereinbelow.

Referring to FIGS. 1, 2A, 2B and 3, the conversion process includes starting with an M113 type vehicle. The process starts with the removal of a rear portion (not shown) of the M113 vehicle. Lower hull 14 is modified to new lower hull 26. In the rear sponson areas new suspension mounting pads 25 are added. Further, new stowage area 24 and front plate 28 are mounted on upper hull 18 and new lower hull 26. The resulting structure, rear drive M113 structure 30, is shown in FIG. 3.

The modified M113 provides a new driver station 27 as compared to the old driver station 17 (See FIG. 1). Functionally all of the power station (not shown) installations such as the cooling system, exhaust, powertrain, air cleaners, etc., remain unchanged. Suspension mounting pads 25 are mounted at the rear sponson. The gear (not shown) is reversed in the transmission to convert to a rear drive.

Accordingly, the rear drive M113 conversion method of the present invention is initiated by starting with a 'thick' skinned M113 which include the families of M901, M981, M577, M1059, M106, M125 and the like vehicles. All the components are removed and the vehicle is stripped to a bare aluminum hull. Top plate 16 and rear plate 12 are removed and front plate 28 is added. A new stowage area 24 is fabricated and installed as shown. The suspension components are refurbished, suspension mounting pads 25 installed and the reverse gearset (not shown) and the transmission are set in place to provide conversion to a rear drive. Further, the powertrain (not shown) is installed, the driver's station is relocated at new location 27. Finally, the vehicle is assembled to provide new rear drive M113 structure 30.

Through the conversion method disclosed herein, a capable and effective scout vehicle can be built. The rear drive M113 of the present invention enables heavy machine gun protection, modular appliqué armor, high performance suspension and powertrain. Further, it utilizes spare parts common to fielded M113 vehicle fleet and thereby enables cost effective maintenance. The final product is a light, compact and efficient tactical vehicle. The rear drive M113 is designed to be roll-on/roll-off C-130 transportable and air dropable. Because of the light weight and efficient use of space volume, two rear drive M113 vehicles are transportable on a single C-130.

While a preferred embodiment of the rear drive M113 has been herein shown and described, it will be apparent to those skilled in the art that various changes and modifications may be made therein without departing frown the spirit of the invention as defined by the scope of the appended claims.

What is claimed is:

1. An overhaul and rear-drive conversion method for an armored vehicle of the M113 vehicle family comprising the steps of:

providing an armored vehicle of the M113 type, said vehicle including a front end, a rear end, a rear portion, an upper hull, and a lower hull with a rear sponson area;

stripping said vehicle to a base aluminum hull including said front end, said rear end, said rear portion, said upper hull, and said lower hull;

removing said rear portion from said base aluminum hull;

modifying the configuration of said lower hull;

adding suspension mounting pads to each side of said modified lower hull in said rear sponson area;

adding a new rear stowage area to said upper hull at said front end of said base aluminum hull;

adding a new front plate to said modified lower hull at said rear end of said base aluminum hull; and welding together said upper hull, said modified lower hull, said top plate, said new rear stowage area, and said new front plate.

2. The method according to claim 1 wherein said conversion method includes relocating a driver's station of said armored vehicle.

3. The method according to claim 1 wherein said new front plate includes oblique and aerodynamic surfaces.

4. The method according to claim 1 wherein said new rear stowage area extends the length of said armored vehicle.

5. An overhaul and rear-drive conversion method for an armored vehicle of the M113 vehicle family to develop a low-cost, light, tactical vehicle comprising the steps of:

providing an armored vehicle of the M113 type, said vehicle including a front end, a rear end, a rear portion a plate, an upper hull, and a lower hull with a rear sponson area;

removing said rear portion and said top plate from said vehicle;

modifying the configuration of said lower hull;

fabricating a combined new top and front plate;

adding said combined new top and front plate to said upper hull and said modified lower hull at said rear end of said vehicle;

adding suspension mounting pads to each side of said modified lower hull in said rear sponson area;

fabricating a new rear stowage area; adding said new rear stowage area to said upper hull at said front end of said vehicle; and welding together said upper hull, said modified lower hull, said rear stowage area, and said combined new top and front plate.

6. The method according to claim 5 wherein said combined new top and front plate is fabricated to include a driver's station centrally therein.

7. The method according to claim 5 wherein said step of fabricating a combined new top and front plate includes forming a combination of substantially horizontal and oblique surfaces therein.

* * * * *